United States Patent [19]

Frei

[11] 4,295,522

[45] Oct. 20, 1981

[54] PROCESS FOR THE PRODUCTION OF A TUBULAR HEAT EXCHANGER, AND A TUBULAR HEAT EXCHANGER PRODUCED ACCORDING TO THIS PROCESS

[76] Inventor: Willi Frei, Zilstrasse 16, CH-9016, St. Gallen, Switzerland

[21] Appl. No.: 930,363

[22] Filed: Aug. 2, 1978

[30] Foreign Application Priority Data

Aug. 3, 1977 [DE] Fed. Rep. of Germany ....... 2734958

[51] Int. Cl.³ ............................................... F28F 9/16
[52] U.S. Cl. ...................................... 165/79; 156/293; 156/296; 165/82; 165/158; 165/175
[58] Field of Search ................ 29/157.4; 165/79, 158, 165/172, 173, 175, 178, 69, 82; 156/293, 296

[56] References Cited

U.S. PATENT DOCUMENTS

| | | | |
|---|---|---|---|
| 3,186,924 | 6/1965 | Williamson | 165/173 |
| 3,447,603 | 6/1969 | Jones | 165/69 |
| 3,633,660 | 1/1972 | Young | 165/173 |
| 3,993,126 | 11/1976 | Taylor | 165/173 |
| 4,044,443 | 8/1977 | Chartet | 165/173 |
| 4,117,884 | 10/1978 | Frei | 165/79 |

FOREIGN PATENT DOCUMENTS

| | | | |
|---|---|---|---|
| 1171474 | 1/1959 | France | 165/178 |
| 2250087 | 5/1975 | France | 165/173 |
| 724017 | 2/1955 | United Kingdom | 165/173 |
| 734008 | 7/1955 | United Kingdom | 165/69 |
| 950548 | 2/1964 | United Kingdom | 165/69 |
| 1151233 | 5/1969 | United Kingdom | 165/69 |
| 1161295 | 8/1969 | United Kingdom | 165/69 |
| 1243942 | 8/1971 | United Kingdom | 165/158 |
| 1288561 | 9/1972 | United Kingdom | 165/79 |

Primary Examiner—Sheldon J. Richter
Attorney, Agent, or Firm—Birch, Stewart, Kolasch & Birch

[57] ABSTRACT

A method for the production of a tubular heat exchanger which comprises introducing the end portions of a plurality of tubes into a corresponding plurality of holes provided in troughs, substantially filling said troughs with a liquid casting resin whereupon the liquid casting resin enters the annular gaps between the holes and the tube end portions due to capillary action, to form, upon solidification of the casting resin, a tube bundle, inserting at least one tube bundle into a housing to form a tubular heat exchanger, the sidewalls of the troughs of the tube bundle forming a gap with the housing, and filling said gap with the casting resin.

3 Claims, 5 Drawing Figures

PROCESS FOR THE PRODUCTION OF A TUBULAR HEAT EXCHANGER, AND A TUBULAR HEAT EXCHANGER PRODUCED ACCORDING TO THIS PROCESS

BACKGROUND AND SUMMARY OF THE INVENTION

The present invention is related to copending U.S. Pat. application, Ser. No. 668,527, filed on Mar. 19, 1976, now U.S. Pat. No. 4,117,884, issued Oct. 3, 1978, which is directed to a process for the production of a tubular heat exchanger wherein a tube bundle consisting of tubes made of silica glass is cast into a casting resin at the tube ends thereof, the vertically arranged tube bundle being inserted with the tube ends being disposed in troughs provided with holes in the bottom thereof for receiving the tube ends. The troughs are subsequently filled with a casting resin whereupon the liquid casting enters, due to a capillary effect, the annular gaps between the holes and the tube ends. The disclosure of this United States Patent and/or of the parallel German Application DOS No. 2,610,817, is fully incorporated into the present invention by reference.

This process, on the whole, has proven itself well, especially on account of the fact that an annular gap is formed between the holes of the trough and the tubes, e.g., silica glass tubes, forming the tube bundle. This gap is filled in a subsequent process step with the casting resin by capillary action. Thus, the material of the tubes is nowhere in contact with the material of the trough. Rather, the casting resin forms a continuous barrier between these two elements. Advantageously, the casting resin is a silicone resin. Because of this procedure, the thermal stresses, which occur during operation and are frequently considerable, are compensated for and absorbed.

The present invention is based on the problem of further developing the process according to my U.S. Pat. No. 4,117,884 so that even the aforementioned thermal stresses between the mounted tube bundles and the metallic housing surrounding the tube bundle or bundles are substantially avoided. To solve this problem, according to the present invention, the troughs with the tube bundle are inserted in a metallic housing so that a gap is formed between the sidewalls of the troughs and the metallic housing, said gap being subsequently filled with the casting resin. Because of this measure, the thermal stresses existing between the metallic housing and the troughs holding the tube bundles are absorbed, since the casting resin is disposed between these two components, which are likewise subject to strong thermal expansions.

Any casting resin which, after vulcanizing, assumes within a few hours the Shore hardness which approximates that of an eraser, can be used in the present invention. The preferred resin is a silicone resin, e.g., organosiloxane polymers. The troughs remaining in the heat exchanger and consisting of sheet metal thus serve as a kind of lost form.

Another preferred feature of the present invention is that the tubes of the tube bundle are placed on a spacer board prior to the casting of the casting resin. The spacer board equalizes any existing differences in the vertical level among the tubes.

A heat exchanger produced according to the present invention is characterized in that the lowermost trough rests on a horizontal flange on the inside of the metallic housing. This provides the necessary support for the tube bundles by the metallic housing, preferably a steel housing.

Several such tube bundles can be produced in separate troughs in the above-described manner to produce modules. In this case, it is preferred to utilize several such modules in the metallic housing.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
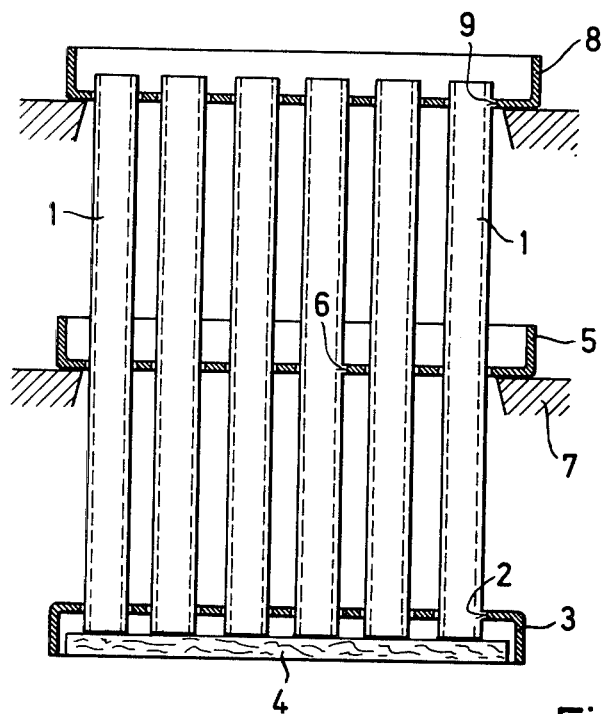
FIG. 1 shows a schematic vertical section through a tube bundle during the casting step to which the tube bundle is subjected to produce a tubular heat exchanger according to the present invention.

First of all, the basic process for manufacturing a module will be explained with reference to FIGS. 1 and 2. A number of glass tubes 1 are inserted with the lower tube ends disposed in holes 2 of a trough 3, the tube ends being placed on a spacer board 4. Depending on the length of the glass tubes, a similar trough 5 with holes 6 is inserted over the tube bundle and placed on shoulders or brackets 7 approximately in the center of the length of the tubes. This central trough 5, however, can also be omitted. The upper ends of the tubes are held by means of a further trough 8 containing holes 9. The outer diameter of the tubes is somewhat smaller than the holes of the troughs. The spacer board 4 serves to level the glass tubes and is removed after the silicone has hardened. Tubes made of all kinds of material can be used as long as they are compatible with the resin for achieving the purpose of the invention. The tubes are preferably made of glass, e.g., silica glass or quartz glass.

Therafter silicon resin is poured between the glass tubes 1, at least into the lower trough 3 and the upper trough 8, and optionally also onto the middle trough 5. By capillary action, the casting resin penetrates into the annular gaps between the holes and the glass tubes and thus embeds the glass tubes on all sides without the tubes entering into contact with the metal of the troughs.

Figure 3:
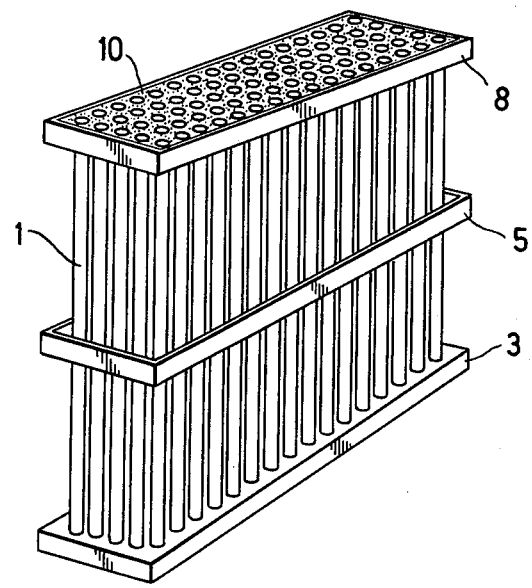
FIG. 3 shows a perspective view of a tube bundle fashioned as a module after the casting step.

After the hardening of the casting resin, a module is created which is shown in FIG. 3 in a perspective view.

Figure 2:
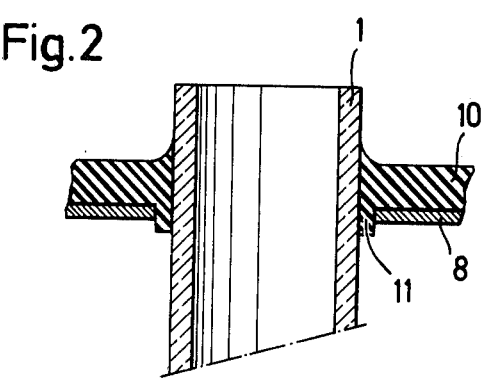
FIG. 2 shows an enlarged detail of FIG. 1.

FIG. 2 shows an enlarged detail, illustrating the hardened silicone 10. The annular gap is denoted therein by numeral 11, with the silicone entering this gap from above.

Figure 4:
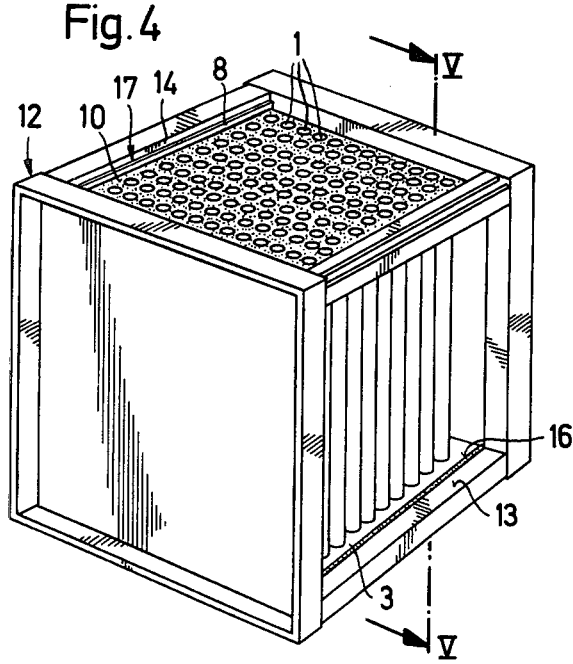
FIG. 4 is a perspective view of a finished tubular heat exchanger.
Figure 5:
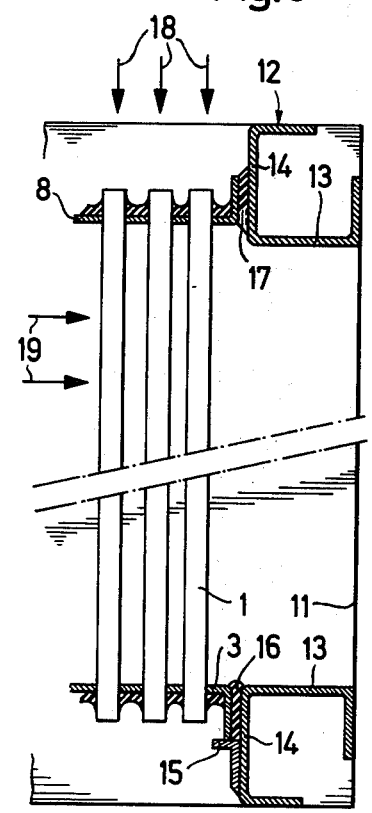
FIG. 5 shows a sectional view of a detail taken along the line V—V of FIG. 4.

According to FIGS. 4 and 5, one or more such modules are inserted in a steel housing 12. The steel housing consists of metal sheets 13 extending continuously in the manner of a frame and equipped with vertical flanges 14. A supporting plate 15 is welded to the lowermost sheet-metal panel 13 and is oriented toward the inside. The lowermost trough 3 rests with its lower edge on this supporting plate. A gap is formed between the wall of this trough 3 and the flange 14 which, after assembly, is likewise filled with silicone casting resin 16. The same takes place at the upper metal sheet 13 in a gap 17 between the flange 14 and the wall of the upper trough 8.

The fresh air is fed, in the illustration of FIG. 5, in the direction of arrows 18, and the exhaust air is conducted in the direction of arrows 19. The troughs 3, 5, and 8 need not necessarily be provided with sidewalls, as shown in the drawings. They can also consist of a suitable synthetic resin material. However, the manufacture with the use of a metal, preferably steel sheet, is preferred.

Advantageously, the upper trough 8, or alternatively the upper trough 8 and intermediate trough 5 are first filled with the silicone resin, and after the resin has hardened, the tube bundle is turned upside down and trough 3 is then filled. However, since sidewalls are not necessarily required, the resin can merely be applied to the top of the trough 3 without turning the tube bundle upside down.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat exchanger comprising a housing, at least one tube bundle disposed in said housing, each tube bundle containing a plurality of substantially parallel tubes, the opposite end portions and a substantially intermediate portion of said tubes being disposed in troughs containing a plurality of holes for receiving said tube end portions, said troughs containing a solidified casting resin which extends into annular gaps between the holes and the tube end portions, a substantially horizontal flange being fixed to the inside of said housing, a lowermost trough resting on said flange and said tube bundle cooperating with the housing so that a gap is formed between the sidewalls of the troughs and the housing, said gap also containing the casting resin.

2. The heat exchanger of claim 1, wherein the casting resin is a silicone resin.

3. The heat exchanger of claim 2, wherein the housing is a metallic housing and the tubes are made of silica glass.

* * * * *